(12) United States Patent
Moy

(10) Patent No.: US 6,820,149 B2
(45) Date of Patent: Nov. 16, 2004

(54) METHOD, SYSTEM, AND PROGRAM FOR TESTING A BUS INTERFACE

(75) Inventor: Andrew Moy, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 10/044,557

(22) Filed: Jan. 11, 2002

(65) Prior Publication Data

US 2003/0135683 A1 Jul. 17, 2003

(51) Int. Cl.$^7$ ................................................. G06F 3/00
(52) U.S. Cl. ......................... 710/104; 710/9; 711/170
(58) Field of Search .............................. 710/8–10, 104; 713/1–100; 711/170

(56) References Cited

U.S. PATENT DOCUMENTS

| | | | |
|---|---|---|---|
| 4,760,553 A | | 7/1988 | Buckley et al. |
| 5,142,683 A | * | 8/1992 | Burkhardt et al. .......... 709/215 |
| 5,371,892 A | * | 12/1994 | Petersen et al. ................ 713/1 |
| 5,590,374 A | * | 12/1996 | Shariff et al. .................. 710/9 |
| 5,634,037 A | | 5/1997 | Sasaki et al. |
| 5,764,929 A | | 6/1998 | Kelley et al. |
| 5,832,241 A | | 11/1998 | Guy et al. |
| 5,850,530 A | | 12/1998 | Chen et al. |
| 5,970,069 A | | 10/1999 | Kumar et al. |
| 5,987,555 A | | 11/1999 | Alzien et al. |
| 6,016,525 A | | 1/2000 | Corrigan et al. |
| 6,018,810 A | | 1/2000 | Olarig |
| 6,026,461 A | | 2/2000 | Baxter et al. |
| 6,078,976 A | | 6/2000 | Obayashi |
| 6,212,590 B1 | | 4/2001 | Melo et al. |

OTHER PUBLICATIONS

PCI Bridges, "21154 Transparent PCT–to–PCI Bridge" [online], 2002, pp. 1–4. [Retrieved on Feb. 15, 2002]. Retrieved from the Internet at <URL: http://developer.intel.com/design/bridge/quicklist/dsc–21154.htm>.

* cited by examiner

Primary Examiner—Paul R. Myers
(74) Attorney, Agent, or Firm—David W. Victor; Konrad, Raynes & Victor LLP

(57) ABSTRACT

Provided are a method, system, and program for performing initialization operations in a system including a bus, bus interface and at least one bus device communicating on the bus. The bus interface includes memory capable of being accessed over the bus by the at least one bus device. All bus devices capable of communicating on the bus are detected and each detected bus device and bus interface is configured with base addresses that enable transmission of Input/Output (I/O) requests over the bus to the memory in the bus interface and memory in any bus device including memory accessible over the bus. Testing is performed on the base addresses of the memory in each bus device including memory accessible over the bus by issuing I/O requests to the base addresses of the memory in each bus device. Memory in the bus interface is tested by issuing I/O requests to the base addresses of the memory in the bus interface over the bus.

49 Claims, 7 Drawing Sheets

METHOD, SYSTEM, AND PROGRAM FOR TESTING A BUS INTERFACE

BACKGROUND OF THE INVENTION

1. Field of the Invention

The present invention relates to a method, system, and program for testing a bus interface.

2. Description of the Related Art

The Peripheral Component Interconnect (PCI) bus architecture provides a low latency path through which devices implementing the PCI architecture can communicate. Details of the PCI bus architecture are described in the publication "PCI Local Bus Specification," Revisions 2.2 (Dec. 1998), published by the PCI Special Interest Group, which publication is incorporated herein by reference in its entirety. Each PCI device that communicates on the PCI bus includes a configuration space including information used to address the device on the PCI bus. During initialization, a device designated as the master processor accesses the PCI bus to detect all the PCI devices present on the PCI bus, builds a consistent address map, and then writes the PCI device base addresses to the configuration space registers of each PCI device. The base address registers define the addresses that other PCI devices on the PCI bus use to communicate with the PCI device to which the addresses are assigned. The base register addresses map into the Input/Output (I/O) space of the device as well as the memory space.

As part of a power-on self test (POST) during initialization, the master processor will test the PCI devices by reading and writing data to the assigned base addresses in the PCI devices to determine whether the read/write operations complete successfully. During the POST initialization, the master processor also tests the memory and registers of the PCI interface used by the master processor. Prior art PCI devices provide a separate bus interface between the master processor and the memory elements of the PCI interface used by the master processor that is separate from the PCI interface. For instance, in the prior art, the master processor may be embedded in a PCI card including memory and registers and the PCI bus interface would include a separate non-PCI bus interface on the card between the processor and the memory elements on the PCI card. Additionally, the master processor may be implemented in an Application Specific Integrated Circuit (ASIC) that includes the PCI interface and PCI memory and registers. During initialization, the master processor would use the non-PCI bus interface on the PCI card to test the memory and registers of the PCI interface used by the master processor. After the master processor verifies the accessibility of the base addresses assigned to the external PCI devices as well as the internal memory elements on the PCI card used by the master processor for PCI communication, the master processor would continue with initialization.

The above prior art initialization architecture requires the use of an additional non-PCI bus interface to test the memory registers of the master processor PCI interface. Further, because an internal interface is used to test the memory elements of the master processor PCI interface, the pins and other PCI interface circuitry between the PCI bus and the master processor PCI interface are not tested because the master processor tests the PCI interface memory elements on the internal non-PCI bus interface.

For these reasons, there is a need in the art for improved techniques for initializing a PCI or other type of bus interface device.

SUMMARY OF THE PREFERRED EMBODIMENTS

Provided are a method, system, and program for performing initialization operations in a system including a bus, bus interface and at least one bus device communicating on the bus. The bus interface includes memory capable of being accessed over the bus by the at least one bus device. All bus devices capable of communicating on the bus are detected and each detected bus device and bus interface is configured with base addresses that enable transmission of Input/Output (I/O) requests over the bus to the memory in the bus interface and memory in any bus device including memory accessible over the bus. Testing is performed on the base addresses of the memory in each bus device including memory accessible over the bus by issuing I/O requests to the base addresses of the memory in each bus device. Memory in the bus interface is tested by issuing I/O requests to the base addresses of the memory in the bus interface over the bus.

In further implementations, the bus interface includes an initiator and target, and the memory in the bus interface is accessible through the target. Testing the memory in the bus interface further comprises transmitting the I/O requests to the initiator. The I/O requests are transmitted to the bus and the target accesses the I/O requests placed on the bus by the initiator and performs the requested I/O requests. The I/O requests testing the memory on the bus interface test circuitry connecting the target and the bus.

Still further, the I/O requests to the memory of the bus interface comprise internal wrap signals between the initiator and target on the bus interface.

The bus interface, bus, and bus devices may implement the Peripheral Component Interconnect (PCI) architecture.

In still further implementations, the bus interface comprises a bridge between a primary bus and secondary bus. In such case, detecting and configuring all the bus devices comprises detecting and configuring all the bus devices capable of communicating on the primary bus and the secondary bus.

Further provided are a method, system, and program for performing a verification of a bus interface including an embedded device and memory. The bus interface enables communication with a bus. The bus interface memory is capable of being accessed by one bus device communicating over the bus and the embedded device uses the bus interface to communicate on the bus. The bus device tests the memory in the bus interface by issuing Input/Output (I/O) requests to the memory in the bus interface over the bus. The embedded device tests the memory in the bus interface by issuing Input/Output (I/O) requests to the memory in the bus interface over the bus, whereby the tests performed by the bus device and embedded device test whether the bus interface is capable of handling requests from multiple bus devices over the bus.

Described implementations provide a technique for testing the operability of memory devices within a bus interface using I/O requests transmitted using the lines connecting the bus and bus interface.

BRIEF DESCRIPTION OF THE FIGURES

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
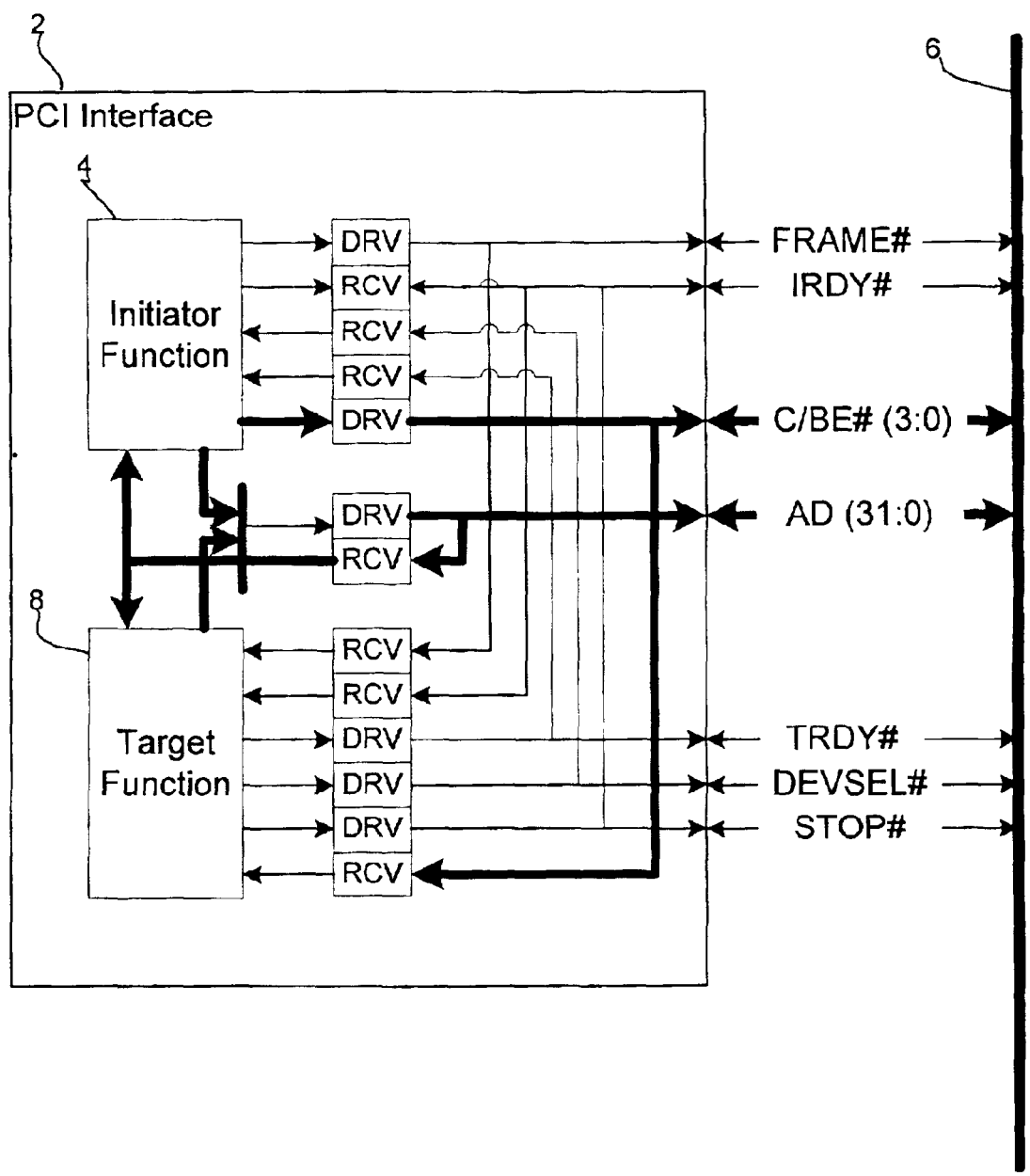
FIG. 1 illustrates a PCI interface in which a PCI internal wrap signal is generated.

Described implementations utilize a wrap signal to test the memory elements on a PCI interface used by a master processor during initialization of a PCI bus system. FIG. 1 illustrates a PCI interface 2 in which a wrap signal is implemented. The PCI interface includes initiator function 4 hardware to send read and write requests to other PCI devices (not shown) over a PCI bus 6. The target function 8 includes hardware to receive read and write requests asserted on the PCI bus 6 that are addressed toward the address space of the PCI interface 2. The PCI interface 2 includes off-chip drivers (DRV) to transmit signals to the PCI bus 6 and on-chip receivers (RCV) to receive signals from the PCI bus 6. A wrap signal is transmitted from the initiator function 4 to the target function 8 on the same PCI interface 2. To generate the wrap signal, the initiator function 4 issues the FRAME# command to indicate the beginning of a data transfer operation and issues the IRDY# command to indicate that the initiator function 4 is ready to transfer data. Upon decoding the AD lines on the PCI bus 6 and detecting a request to one base address in the target function 8 configuration space, the target function 8 would assert the DEVSEL# command to access the request on the PCI bus 6. The target function 8 would then issue the TRDY# command to indicate that the target 8 is ready to complete the data transaction asserted on the PCI bus 6.

A wrap signal comprises a data request transmitted from the initiator function 4 to the target function 8 on the same PCI interface 2. The bold lines in FIG. 1 illustrate the signal paths of the wrap signal. The initiator function 4 would transmit the bus command C/BE# to the PCI bus 6 that is addressed to an address in the target function 8 configuration space. In response, the target function 8 would issue the DEVSEL# to take control over that request on the PCI bus 6. In this way, the initiator function 4 issues wrap signals to send read and write commands to the target function on the same PCI interface 2 by addressing the requests to the base addresses in the configuration space of the target function 8. By using the wrap signal, the initiator function 4 is communicating with the target function 8 using the same PCI interface 2 components that another PCI device on the PCI bus 6 would use to communicate with the target function 8.

Figure 2:
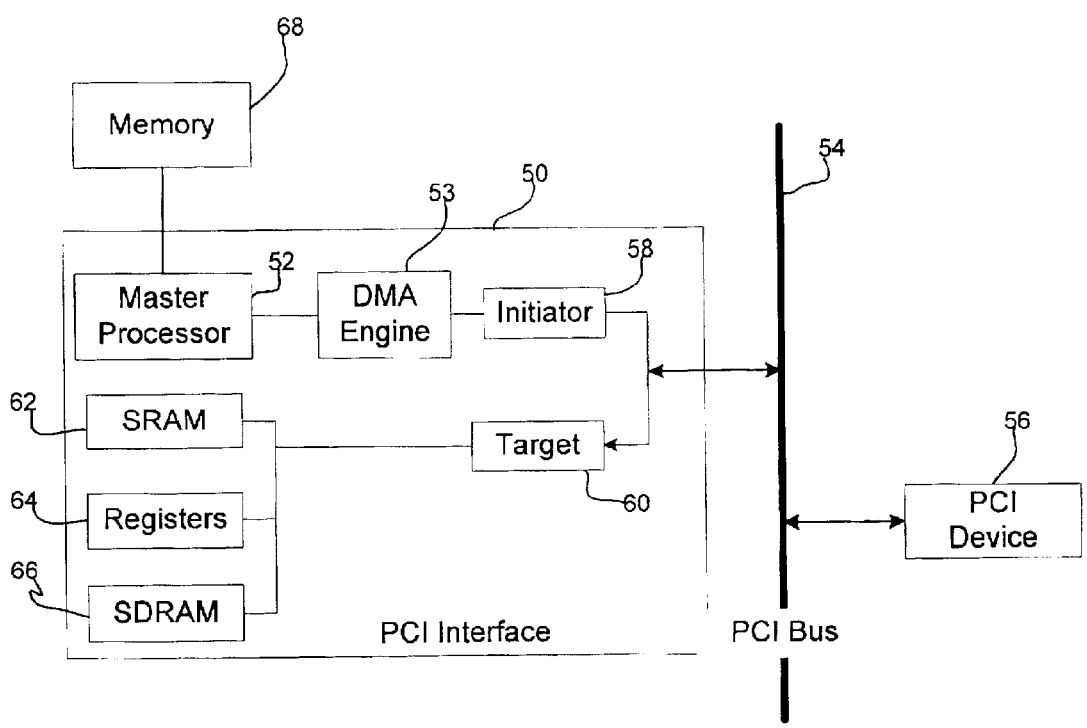
FIG. 2 illustrates a PCI architecture in which aspects of the invention are implemented.

FIG. 2 illustrates a PCI implementation in which aspects of the invention are implemented. A PCI interface 50 includes an embedded master processor 52 that is used to initialize and configure the address space of one or more PCI devices on the PCI bus 54, e.g., PCI device 56. The PCI interface further includes a PCI initiator 58 to communicate PCI read and write commands to the PCI bus 54 and a target 60 that receives read and write requests from the PCI bus 54 that target base addresses in the configuration space of the target 60. A Direct Memory Access (DMA) Engine 53 handles Input/Output requests between the master processor 52 and initiator 58. The base addresses in the configuration space of the target define addressable locations in the memory components accessible through the target 60, including an SRAM 62, registers 64, and SDRAM 66. The registers 64 may include the configuration space for the target 60. The master processor 68 may also access an external memory device 68 for operations.

Figure 3:
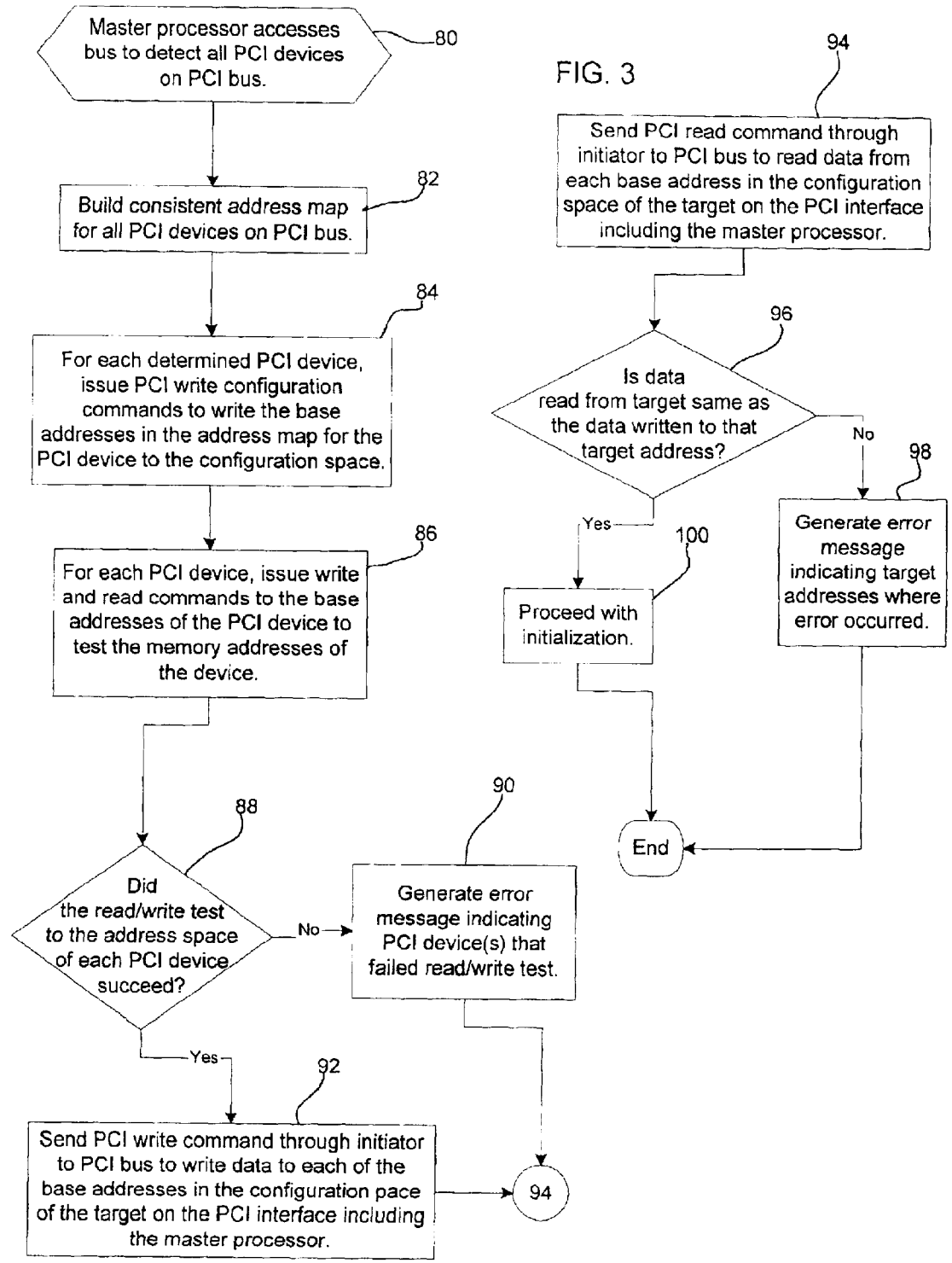
FIG. 3 illustrates logic to initialize the PCI architecture shown in FIG. 2 in accordance with implementations of the invention.

FIG. 3 illustrates logic implemented in the master processor 52 to configure the PCI bus 54 and PCI interface 50. Control begins at block 80 with the master processor 52 accessing the PCI bus 54 to detect all the PCI devices 56 that communicate on the PCI bus 54. The master processor 52 then builds (at block 92) an address map for all the PCI devices 56 on the PCI bus 54. For each determined PCI device 56, the master processor 52 issues (at block 84) PCI write configuration commands to write the base addresses in the determined address map to the configuration space of each PCI device 56, including the PCI interface 50 used by the master processor 52 to access the PCI bus 54. The master processor 52 then issues (at block 86) PCI write and read commands to write and then read data to the base addresses of memory locations in the PCI devices 56 to test their operation. If (at block 88) the write/read test to any addressable location in the configuration space of any PCI device failed, i.e., the data read differed from the data written, then the master processor 52 generates (at block 90) an error message indicating the PCI device(s) that failed the write/read diagnostic test. This error message may further indicate the base addresses at which the error occurred. From block 90, control may proceed to block 94 to continue testing.

If (at block 88) all the write/read tests succeeded, then the master processor 52 sends (at block 92) a PCI write command through the initiator 58 to the PCI bus 54 that targets an address in the target 60 configuration space. In response, the target 60 would assert control over the request on the PCI bus 54 and write the requested data to the specified base address location in one target memory location 62, 64, 66. After writing the data to a memory location accessible to the PCI bus 54 through the target 60, the master processor 52 would issue (at block 94) a PCI read command to the PCI bus 54 to read the data from the address locations to which data was written. If (at block 96) the read data is not the same as the data written to any tested addressable location, then the master processor 52 would generate (at block 98) an error message indicating the target addresses where the error occurred. If (at block 96) the data read from addressable locations in the memory elements 62, 64, 66 behind the target 60 is the same as the data written, then the master processor 52 proceeds (at block 100) with the configuration knowing that the target 60 memory elements are operational.

With the logic of FIG. 3, the master processor 52 embedded in the PCI interface 50 uses wrap signals to cause the initiator 56 to communicate with the target 60 over the PCI bus 54. This technique avoids any need for an additional non-PCI bus interface between the master processor 52 and memory elements 62, 64, 66 and further tests the circuitry providing the interface between the target 60 and the PCI bus 54.

Figure 4:
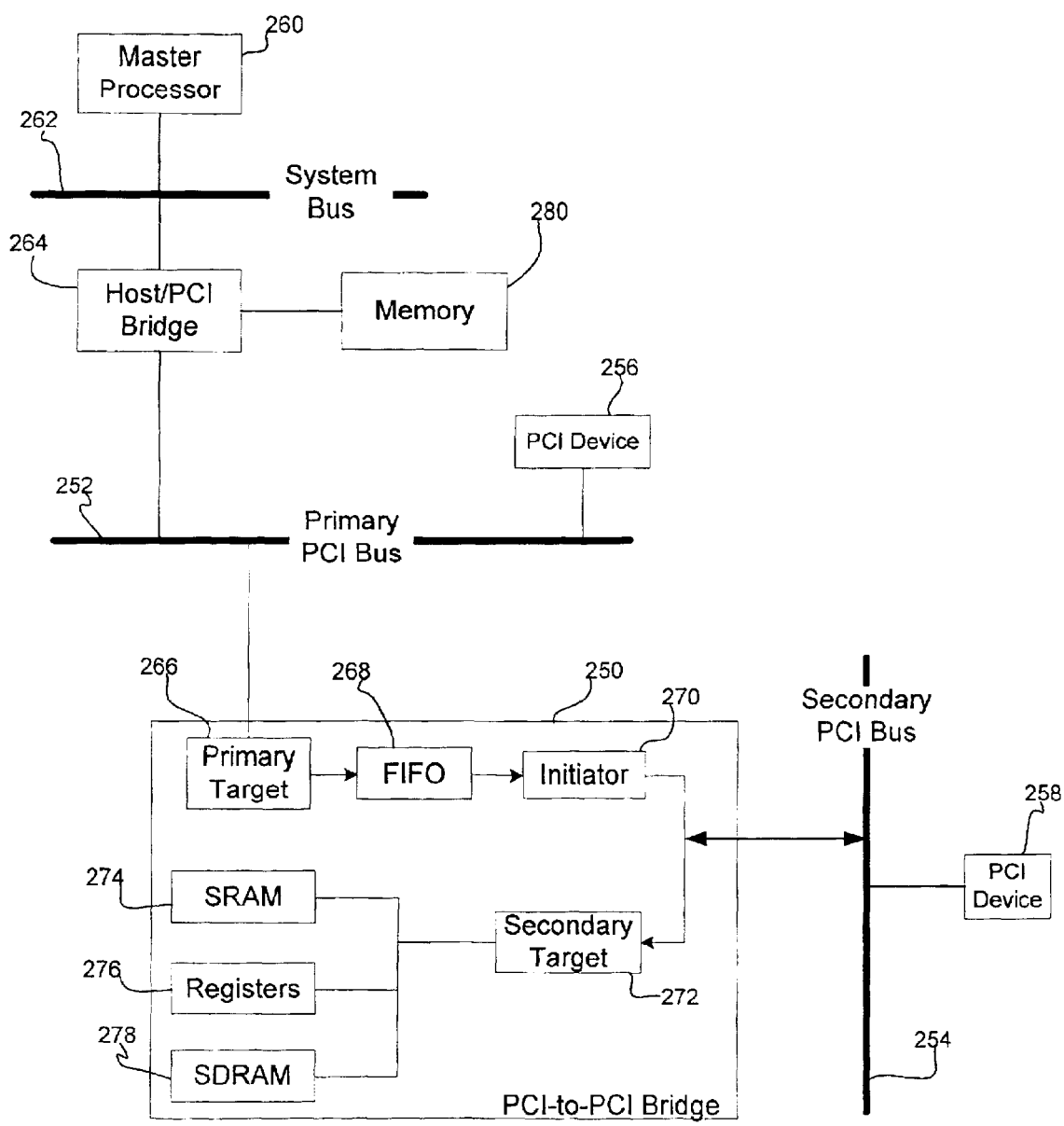
FIG. 4 illustrates an additional PCI architecture in which aspects of the invention are implemented.

FIG. 4 illustrates an additional architecture implementation where a PCI-to-PCI bridge 250 enables communication between a primary PCI bus 252 and a secondary PCI bus 254 to which one or more PCI devices 256 and 258, respectively, are attached. A master processor 260, which performs initialization and configuration operations, communicates with the PCI-to-PCI bridge 250 through a system bus 262 and host/PCI bridge 264. The PCI-to-PCI bridge 250 includes a primary target 266, which includes hardware to receive communications from the primary PCI bus 252, a First-in-First-Out (FIFO) buffer 268 to buffer requests received at the primary target 266 intended for the secondary PCI bus 254, and initiator hardware 270 to issue read/write requests to the secondary PCI bus 254 to the PCI devices 258 on the secondary PCI bus 254 or to PCI devices on a PCI bus attached to a yet further PCI bridge attached to the secondary PCI bus 254 or a bus below the secondary PCI bus 254. The buffer 268 may be used for speed matching and to avoid overruns. The PCI-to-PCI bridge 250 further includes secondary target hardware 272 providing access to memory elements 274, 276, and 278 in the PCI-to-PCI-bridge 250 via the secondary PCI bus 254. The target 272 would respond to requests asserted on the secondary PCI bus 254 that are directed toward a base address of one of the memory elements 272, 274, and 276. Additional PCI-to-PCI bridges may be attached to or below the secondary PCI bus 254 providing access to still further PCI busses and PCI devices. The master processor 260 is further capable of accessing a memory device 280 through the host/PCI bridge 264. Further details of the architecture of a PCI-to-PCI bridge are described in the publication entitled "PCI to PCI Bridge Architecture Specification," Revision 1.1 (Dec., 18, 1998), published by the PCI Special Interest Group, which publication is incorporated herein by reference in its entirety.

Figure 5:
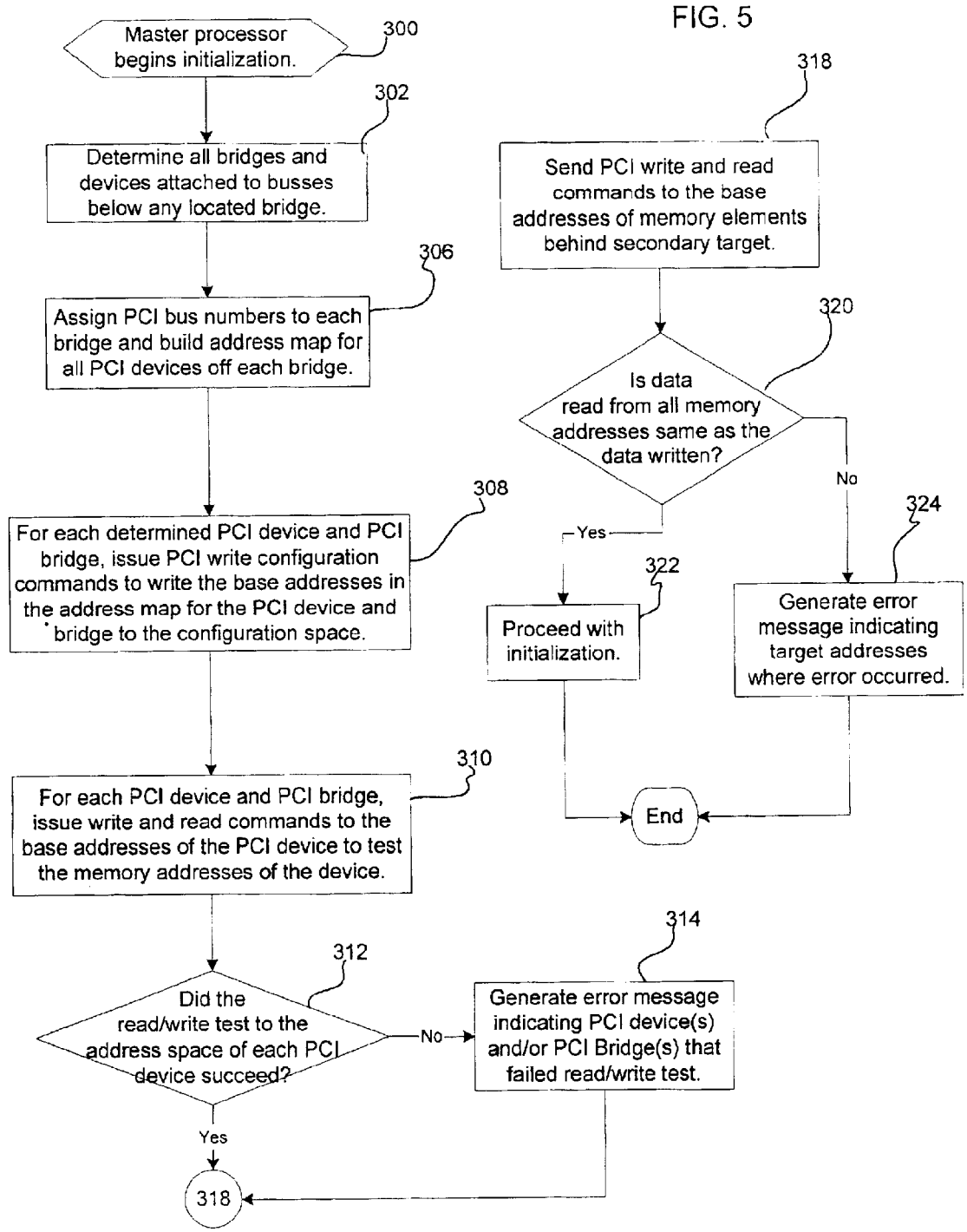
FIG. 5 illustrates logic to initialize the PCI architecture shown in FIG. 4 in accordance with implementations of the invention.

FIG. 5 illustrates logic implemented in the master processor 260 to perform an initialization of the PCI-to-PCI bridge 250 and PCI devices 256, 258 attached to the PCI busses 252 and 254 or any other busses below the secondary PCI bus 254. After beginning initialization (at block 300), the master processor 260 accesses (at block 302) the system bus 262 to determine all PCI-to-PCI bridges 250 attached directly or indirectly to the system bus 262, all PCI busses 252 and 254 below any determined bridge, and any PCI device 256 and 258 attached to one of the determined PCI busses 252 and 254. The master processor 260 then assigns (at block 306) PCI bus numbers to each located bridge and builds a consistent map of addresses for located bridges 264, 250 and PCI devices 256, 258 in a manner known in the art. For each determined PCI bridge 250, 264 and PCI device 256, 258, the master processor 260 issues (at block 308) PCI write configuration commands to write the base addresses to the configuration space of each PCI bridge 250, 264 and PCI device 256, 258 accessible through such bridge.

The master processor 260 then issues (at block 310) write and read commands to the base addresses of the memory in each determined PCI device and PCI bridge. If (at block 312) the write/read test did not succeed for every tested PCI bridge 250, 264 and PCI device 256, 258, i.e., the written data did not match the read data, then an error message is generated (at block 314) indicating the PCI bridge(s) and/or PCI device(s) that failed the test. The addresses where the failure occurred may also be listed. If (at block 312) all the write/read tests passed or from block 314, control proceeds to block 318 where the master processor 260 sends PCI read and write commands to the base addresses assigned to the memory elements 274, 276, and 278 accessed through the secondary target 272. Such commands would be passed through the host/PCI bridge 264 to the primary target 266 over the primary PCI bus 252. The primary target 266 would select the requests from the primary PCI bus 252 and buffer the requests in the FIFO buffer 268. The initiator 270 would then access the commands from the FIFO buffer 268 and transmit the requests to the secondary PCI bus 254. The secondary target 272 would assert control over the request directed toward a base address in one of the memory elements 274, 276, and 278 accessed through the secondary target 272.

If (at block 320) the data read from all of the targeted memory elements 274, 276, and 278 is the same as what was written, then the master processor 260 proceeds (at block 322) with initialization. Otherwise, if (at block 320) there was a failure at one of the targeted addresses of the memory elements 274, 276, and 278, then an error message is generated (at block 324) indicating the targeted addresses where the error occurred.

As with the initialization described with respect to FIGS. 2 and 3, the memory elements on the PCI-to-PCI bridge used by the master processor 260 are tested without the need for additional bus interfaces and tested in a manner that checks the circuitry between the secondary PCI bus 254 and the secondary target 272.

In further implementations, the wrap signal may be utilized in the design verification phase when developing a PCI type device. During PCI design testing, the target in the PCI device must be tested to determine whether the target can handle requests from multiple initiators. In the prior art, to perform such testing, the PCI developer must attach the PCI prototype device to a PCI bus and then attach multiple PCI driver models to the same PCI bus, each including initiator and target hardware. The multiple PCI driver models would then be programmed to initiate requests to the target on the PCI prototype device to test the ability of the target to handle requests from multiple initiators. The design and coordination of the operations of multiple PCI drivers, including testing of posted writes and delayed reads, requires considerable development effort.

Figure 6:
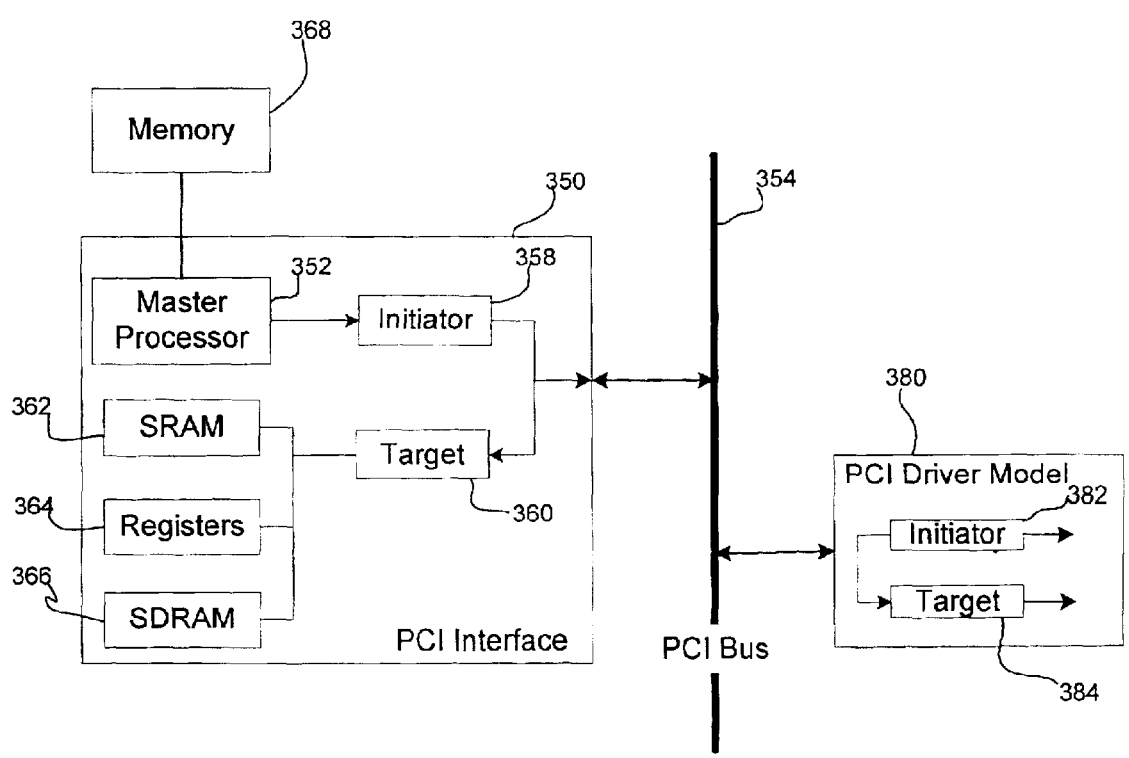
FIG. 6 illustrates a PCI verification system in which aspects of the invention are implemented.

FIG. 6 illustrates an implementation of a PCI interface and PCI bus architecture similar to the PCI interface architecture described with respect to FIG. 1, where the PCI interface 350 includes components 352, 358, 360, 362, 364, and 366 similar to the components 52, 58, 60, 62, 64, and 66. In the described implementations, the verification architecture includes a PCI driver model 380 having initiator 382 and target 384 hardware, wherein the initiator 382 is capable of generating read/write requests to test the target 360 over the PCI bus 354. A DMA engine (not shown) may process I/O requests between the master processor 352 and the initiator 358.

Figure 7:
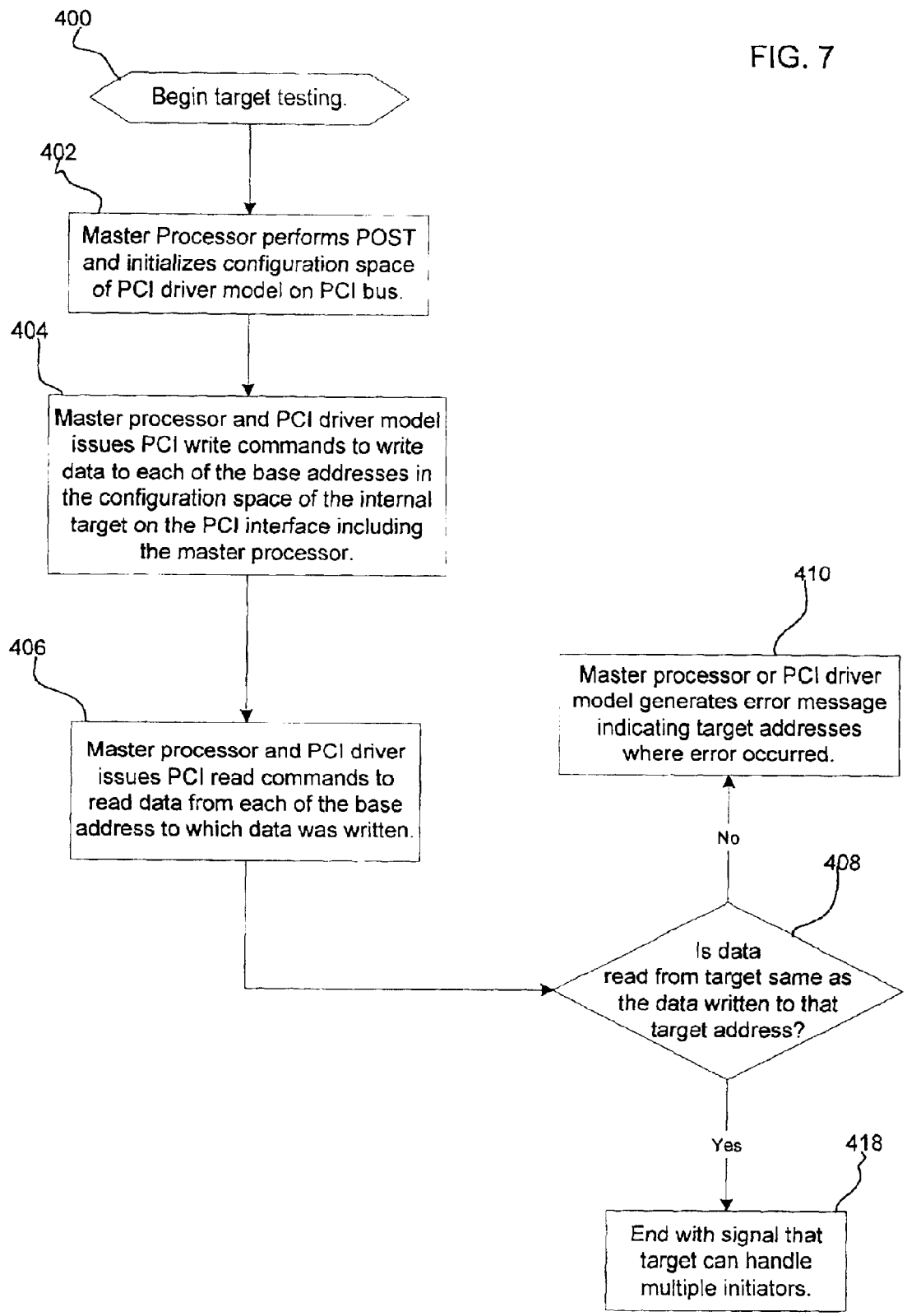
FIG. 7 illustrates logic to test and verify the design of the PCI architecture shown in FIG. 6 in accordance with implementations of the invention.

FIG. 7 illustrates logic implemented in the design verification system shown in FIG. 6 to test whether the target 360 can handle I/O requests from multiple initiators. Control begins at block 400 to begin testing the target 360. The embedded master processor 352 would perform (at block 402) the POST and initialization operations to configure the address space for the PCI bus 354 and PCI driver model 380. The master processor 352 and PCI driver model initiator 382 are programmed to issue (at block 404) PCI write commands to write data to the base addresses of the memory elements 362, 364, and 366, which may include posted writes. After the writes, the master processor 352 and PCI driver model initiator 382 issue (at block 406) PCI read commands to the addresses in the memory elements 362, 364, 366 to which the data was written. The read commands from the master processor 352 are sent to the initiator 358. The initiator 358, in turn, sends the read commands directed to the configuration space of the target 360 to the PCI bus 354. The target 360, upon detecting base addresses in the target 360 configuration space on the PCI bus 354, would then assert control over those read commands and read the data from the target addresses in the memory elements 362, 364, and 366 and return the requested data to the PCI bus 354 for return to the embedded processor 352 through the initiator 358. Writes would be processed in a similar manner, in that the writes would be sent to the initiator 358, which in turn sends the writes to the target 360 to apply to the target configuration space. If (at block 408) the data written from the master processor 352 and PCI driver model 380 to the target memory addresses is not the same as that read for all targeted addresses, then the device detecting the error, which may be either the embedded processor 352 or PCI driver model 380, generates (at block 410) an error message indicating the targeted addresses where the error occurred. If no error occurred, i.e., the written and read data was the same, then the master processor 352 and PCI driver model 380 would generate a signal that no error occurred.

The described architecture and logic of FIGS. 6 and 7 provides a technique for testing whether a PCI target can handle requests from multiple initiators using an architecture that only requires the use of one PCI driver model 380 having an initiator 382 to issue the test request With the described implementations, the testing for an additional initiator is performed by the embedded processor 352 using the PCI internal wrap mode. In this way, the described implementations avoid the need for implementing and coordinating multiple PCI driver models.

Additional Implementation Details

The described logic for performing initialization and test verification operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CDROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the initialization and configuration operations, and internal wrap signal testing, were performed by a processor device. In alternative implementations, any type of device may perform the initialization, such as a Basic Input Operating System (BIOS) component or other hardware device dedicated to initialization or configuration. Alternatively, the processor performing the initialization and configuration may be designed to perform operations unrelated to configuration and initialization. Still further, the initialization operations may be distributed across multiple hardware components and/or processors.

In the described implementations, an initialization device that initializes the configuration space of the PCI devices uses the internal wrap signal to test the memory on the bus interface or bridge. In alternative implementations, the component that tests the operation of memory within a PCI device using the internal wrap signal may not perform initialization operations. In implementations including a DMA engine between the initiator and master processor, the DMA engine may perform the testing operations, thereby relieving the master processor of such burden.

In the described implementations, the initialization did not complete if the wrap signal testing of the memory elements failed. In alternative implementations, the initialization may proceed with errors noted.

In further implementations, the PCI architecture may include additional PCI devices and bridges than those shown in FIGS. 2, 4, and 6.

The described bus and bridge implementations utilized the PCI architecture. However, in alternative interface implementations, bus and bridge technology known in the art other than PCI may be used to implement the bridge and bus interfaces.

Certain logic was described as being performed by specific components, such as the processor, initiator, target, PCI driver model, etc. Notwithstanding, described as being implemented within specific components may be implemented elsewhere.

The described implementations discussed the use of PCI read and write operations to test the operation of addressable memory elements. Any type of read and write operation may be used to test the memory operation, such as posted writes, delayed reads, delayed writes, etc.

In the described implementations, the memory in the bridge and bus interface was tested by comparing data read from the memory with what was originally written. In alternative implementations, the memory may be tested in a manner different than comparing data read with what was originally written.

In the described implementations, the master processor functions as an initialization device that configures the address space of the PCI interface. In alternative implementations, multiple devices or device components may perform the initialization operations described with respect to the master processor.

The preferred logic of FIGS. 3, 5, and 7 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

The foregoing description of the described implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing initialization operations in a system including a bus, bus interface, at least one bus device communicating on the bus, wherein the bus interface includes memory capable of being accessed over the bus by the at least one bus device, comprising:

detecting all bus devices capable of communicating on the bus;

configuring each detected bus device and bus interface with base addresses that enable transmission of Input/Output (I/O) requests over the bus to the memory in the bus interface and memory in any bus device including memory accessible over the bus;

testing the base addresses of the memory in each bus device including memory accessible over the bus by issuing I/O requests to the base addresses of the memory in each bus device; and testing the memory in the bus interface by issuing I/O requests to the base addresses of the memory in the bus interface over the bus.

2. The method of claim 1, wherein the bus interface includes an initiator and target, wherein the memory in the bus interface is accessible through the target, and wherein testing the memory in the bus interface further comprises:

transmitting the I/O requests to the initiator, wherein the initiator transmits the I/O requests to the bus, and wherein the target accesses the I/O requests placed on the bus by the initiator and performs the requested I/O requests, whereby the I/O requests testing the memory on the bus interface further test circuitry connecting the target and the bus.

3. The method of claim 2, wherein the I/O requests to the memory of the bus interface comprise internal wrap signals between the initiator and target on the bus interface.

4. The method of claim 1, wherein the bus interface, bus, and bus devices implement the Peripheral Component Interconnect (PCI) architecture.

5. The method of claim 1, wherein the steps of detecting and configuring the bus devices, testing the base addresses of the memory, and testing the memory in the bus interface is performed by an initialization device embedded within the bus interface.

6. The method of claim 1, wherein the bus interface comprises a bridge between a primary bus and secondary bus, wherein detecting and configuring all the bus devices comprises detecting and configuring all the bus devices capable of communicating on the primary bus and the secondary bus.

7. The method of claim 6, wherein the steps of detecting and configuring the bus devices, testing the base addresses of the memory, and testing the memory in the bus interface is performed by an initialization device, wherein the initialization device communicates with the bridge over the primary bus.

8. The method of claim 7, wherein the bridge includes an initiator, a primary target to receive requests from the primary bus, and a secondary target to receive requests from the secondary bus, wherein the memory in the bridge is accessible through the secondary target, and wherein testing the memory in the bus interface further comprises:

transmitting the I/O requests to the primary target over the primary bus, wherein the primary target transmits the I/O requests to the initiator, and wherein the initiator sends the I/O requests to the secondary bus, wherein the secondary target accesses the I/O requests placed on the secondary bus by the initiator and performs the requested I/O requests to the base addresses of the memory in the bridge, whereby the I/O requests testing the memory in the bridge tests circuitry connecting the secondary target and the secondary bus.

9. The method of claim 8, wherein the I/O requests to the bridge comprise internal wrap signals between the initiator and the secondary target in the bridge.

10. The method of claim 1, wherein testing the memory in the bus interface and each bus device further comprises:

writing data to the base addresses of the memory;

reading the base addresses to which data was written; and for each base address to which data was written, comparing the data read with the data written to determine whether the data read and written to each base address is the same, wherein there is an error if the data read and written data does not match.

11. The method of claim 1, wherein a Direct Memory Access (DMA) engine performs the step of testing the memory in the bus interface and wherein an initialization device performs the steps of detecting and configuring the bus devices.

12. A method for performing a verification of a bus interface including an embedded device and memory, wherein the bus interface enables communication with a bus, wherein the bus interface memory is capable of being accessed by one bus device communicating over the bus, and wherein the embedded device uses the bus interface to communicate on the bus, comprising:

causing the bus device to test the memory in the bus interface by issuing Input/Output (I/O) requests to the memory in the bus interface over the bus; and causing the embedded device to test the memory in the bus interface by issuing Input/Output (I/O) requests to the memory in the bus interface over the bus, whereby the tests performed by the bus device and embedded device test whether the bus interface is capable of handling requests from multiple bus devices over the bus.

13. The method of claim 12, wherein the bus interface includes an initiator and target, wherein the memory in the bus interface is accessible through the target, and wherein testing the memory in the bus interface with the embedded device further comprises:

transmitting the I/O requests to the initiator, wherein the initiator transmits the I/O requests to the bus, and wherein the target accesses the I/O requests placed on the bus by the initiator and performs the requested I/O requests, whereby the I/O requests from the initiator testing the memory on the bus interface further test circuitry connecting the target and bus.

14. The method of claim 13, wherein the I/O requests to the memory of the bus interface from the embedded device comprises internal wrap signals between the initiator and target on the bus interface.

15. The method of claim 12, wherein the bus interface, bus, and bus devices implement the Peripheral Component Interconnect (PCI) architecture.

16. The method of claim 12, wherein the embedded device further performs initialization operations to assign base addresses to bus devices and the bus interface that communicate over the bus.

17. A system for performing initialization operations, comprising:

(a) a bus;
(b) a bus interface;
(c) at least one bus device communicating on the bus;
(d) memory within the bus interface capable of being accessed over the bus by the at least one bus device;
(e) an initialization device that uses the bus interface to communicate on the bus;
(f) logic implemented in the initialization device to initialize communication on the bus by performing:
  (i) detecting all bus devices capable of communicating on the bus;
  (ii) configuring each detected bus device and bus interface with base addresses that enable transmission of Input/Output (I/O) requests over the bus to the memory in the bus interface and memory in any bus device including memory accessible over the bus;
  (iii) testing the base addresses of the memory in each bus device including memory accessible over the bus by issuing I/O requests to the base addresses of the memory in each bus device; and
  (iv) testing the memory in the bus interface by issuing I/O requests to the base addresses of the memory in the bus interface over the bus.

18. The system of claim 17, further comprising:
an initiator and target in the bus interface, wherein the memory in the bus interface is accessible through the target, and wherein the logic implemented in the initialization device further performs:
transmitting the I/O requests to the initiator, wherein the initiator transmits the I/O requests to the bus, and wherein the target accesses the I/O requests placed on the bus by the initiator and performs the requested I/O requests, whereby the I/O requests testing the memory on the bus interface further test circuitry connecting the target and the bus.

19. The system of claim 18, wherein the I/O requests to the memory of the bus interface comprise internal wrap signals between the initiator and target on the bus interface.

20. The system of claim 17, wherein the bus interface, bus, bus devices, and initialization device implement the Peripheral Component Interconnect (PCI) architecture.

21. The system of claim 17, wherein the initialization device is embedded within the bus interface.

22. The system of claim 17, further comprising:
a primary bus;
a secondary bus, wherein the bus interface comprises a bridge between the primary bus and secondary bus, wherein the logic implemented in the initialization device for detecting and configuring all the bus devices detects and configures all the bus devices capable of communicating on the primary bus and the secondary bus.

23. The system of claim 22, wherein the initialization device communicates with the bridge over the primary bus.

24. The system of claim 23, further comprising:
a primary target in the bridge to receive requests from the primary bus;
a secondary target in the bridge to receive requests from the secondary bus, wherein the memory in the bridge is accessible through the secondary target;
an initiator in the bridge, and
wherein the logic implemented in the initialization device for testing the memory in the bus interface further transmits the I/O requests to the primary target over the primary bus, wherein the primary target transmits the I/O requests to the initiator, and wherein the initiator sends the I/O requests to the bus, wherein the secondary target accesses the I/O requests placed on the secondary bus by the initiator and performs the requested I/O requests to the base addresses of the memory in the bridge, whereby the I/O requests testing the memory in the bridge tests circuitry connecting the secondary target and the secondary bus.

25. The system of claim 24, wherein the I/O requests to the bridge comprise internal wrap signals between the initiator and the secondary target in the bridge.

26. The system of claim 17, wherein the logic implemented in the initialization device for testing the memory in the bus interface and each bus device further performs:
writing data to the base addresses of the memory;
reading the base addresses to which data was written; and
for each base address to which data was written, comparing the data read with the data written to determine whether the data read and written to each base address is the same, wherein there is an error if the data read and written data does not match.

27. The system of claim 17, further comprising:
a Direct Memory Access (DMA) engine, wherein the initialization device transmits the DMA engine the writes to test the memory in the bus interface.

28. A system for performing a verification of a bus interface, comprising:
a bus interface;
an embedded device within the bus interface;
a memory within the bus interface;
a bus, wherein the bus interface enables communication with the bus;
at least one bus device capable of accessing the bus interface memory over the bus, wherein the embedded device uses the bus interface to communicate on the bus;
logic implemented in one bus device to test the memory in the bus interface by issuing Input/Output (I/O) requests to the memory in the bus interface over the bus; and
logic implemented in the embedded device to test the memory in the bus interface by issuing Input/Output (I/O) requests to the memory in the bus interface over the bus, whereby the tests performed by the bus device and embedded device test whether the bus interface is capable of handling requests from multiple bus devices over the bus.

29. The system of claim 28, further comprising:
an initiator in the bus interface;
a target in the bus interface, wherein the memory in the bus interface is accessible through the target, and
wherein the logic implemented in the embedded device for testing the memory in the bus interface further transmits the I/O requests to the initiator, wherein the initiator transmits the I/O requests to the bus, and wherein the target accesses the I/O requests placed on the bus by the initiator and performs the requested I/O requests, whereby the I/O requests from the initiator testing the memory on the bus interface further test circuitry connecting the target and bus.

30. The system of claim 28, wherein the I/O requests to the memory of the bus interface from the embedded device comprises internal wrap signals between the initiator and target on the bus interface.

31. The system of claim 28, wherein the bus interface, bus, and bus devices implement the Peripheral Component Interconnect (PCI) architecture.

32. The system of claim 28, wherein the embedded device further includes logic to perform initialization operations to assign base addresses to bus devices and the bus interface that communicate over the bus.

33. An article of manufacture including code for performing initialization operations in a system including a bus, bus interface, at least one bus device communicating on the bus, wherein the bus interface includes memory capable of being accessed over the bus by the at least one bus device, wherein the code causes operations comprising:

detecting all bus devices capable of communicating on the bus;

configuring each detected bus device and bus interface with base addresses that enable transmission of Input/Output (I/O) requests over the bus to the memory in the bus interface and memory in any bus device including memory accessible over the bus;

testing the base addresses of the memory in each bus device including memory accessible over the bus by issuing I/O requests to the base addresses of the memory in each bus device; and testing the memory in the bus interface by issuing I/O requests to the base addresses of the memory in the bus interface over the bus.

34. The article of manufacture of claim 33, wherein the bus interface includes an initiator and target, wherein the memory in the bus interface is accessible through the target, and wherein testing the memory in the bus interface further comprises:

transmitting the I/O requests to the initiator, wherein the initiator transmits the I/O requests to the bus, and wherein the target accesses the I/O requests placed on the bus by the initiator and performs the requested I/O requests, whereby the I/O requests testing the memory on the bus interface further test circuitry connecting the target and the bus.

35. The article of manufacture of claim 34, wherein the I/O requests to the memory of the bus interface comprise internal wrap signals between the initiator and target on the bus interface.

36. The article of manufacture of claim 33, wherein the bus interface comprises a bridge between a primary bus and secondary bus, wherein detecting and configuring all the bus devices comprises detecting and configuring all the bus devices capable of communicating on the primary bus and the secondary bus.

37. The article of manufacture of claim 36, wherein the bridge includes an initiator, a primary target to receive requests from the primary bus, and a secondary target to receive requests from the secondary bus, wherein the memory in the bridge is accessible through the secondary target, and wherein testing the memory in the bus interface further comprises:

transmitting the I/O requests to the primary target over the primary bus, wherein the primary target transmits the I/O requests to the initiator, and wherein the initiator sends the I/O requests to the bus, wherein the secondary target accesses the I/O requests placed on the secondary bus by the initiator and performs the requested I/O requests to the base addresses of the memory in the bridge, whereby the I/O requests testing the memory in the bridge tests circuitry connecting the secondary target and the secondary bus.

38. The article of manufacture of claim 37, wherein the I/O requests to the bridge comprise internal wrap signals between the initiator and the secondary target in the bridge.

39. The article of manufacture of claim 33, wherein testing the memory in the bus interface and each bus device further comprises:

writing data to the base addresses of the memory;

reading the base addresses to which data was written; and for each base address to which data was written, comparing the data read with the data written to determine whether the data read and written to each base address is the same, wherein there is an error if the data read and written data does not match.

40. An article of manufacture of code for performing a verification of a bus interface including an embedded device and memory, wherein the bus interface enables communication with a bus, wherein the bus interface memory is capable of being accessed by one bus device communicating over the bus, and wherein the embedded device uses the bus interface to communicate on the bus, wherein the code causes operations comprising:

causing the bus device to test the memory in the bus interface by issuing Input/Output (I/O) requests to the memory in the bus interface over the bus; and causing the embedded device to test the memory in the bus interface by issuing Input/Output (I/O) requests to the memory in the bus interface over the bus, whereby the tests performed by the bus device and embedded device test whether the bus interface is capable of handling requests from multiple bus devices over the bus.

41. The article of manufacture of claim 40, wherein the bus interface includes an initiator and target, wherein the memory in the bus interface is accessible through the target, and wherein testing the memory in the bus interface with the embedded device further comprises:

transmitting the I/O requests to the initiator, wherein the initiator transmits the I/O requests to the bus, and wherein the target accesses the I/O requests placed on the bus by the initiator and performs the requested I/O requests, whereby the I/O requests from the initiator testing the memory on the bus interface further test circuitry connecting the target and bus.

42. The article of manufacture of claim 41, wherein the I/O requests to the memory of the bus interface from the embedded device comprises internal wrap signals between the initiator and target on the bus interface.

43. A system for performing initialization operations in a system including a bus, bus interface, at least one bus device communicating on the bus, wherein the bus interface includes memory capable of being accessed over the bus by the at least one bus device, comprising:

means for detecting all bus devices capable of communicating on the bus;

means for configuring each detected bus device and bus interface with base addresses that enable transmission of Input/Output (I/O) requests over the bus to the memory in the bus interface and memory in any bus device including memory accessible over the bus;

means for testing the base addresses of the memory in each bus device including memory accessible over the bus by issuing I/O requests to the base addresses of the memory in each bus device; and means for testing the memory in the bus interface by issuing I/O requests to the base addresses of the memory in the bus interface over the bus.

44. The system of claim 43, wherein the bus interface comprises a bridge between a primary bus and secondary bus, wherein the means for detecting and configuring all the bus devices detects and configures all the bus devices capable of communicating on the primary bus and the secondary bus.

45. The system of claim 44, wherein the bridge includes a primary target to receive requests from the primary bus, a secondary target to receive requests from the secondary bus, wherein the memory in the bridge is accessible through the secondary target, and wherein the means for testing the memory in the bus interface further performs:

transmitting the I/O requests to the primary target over the primary bus, wherein the primary target transmits the I/O requests to the initiator, and wherein the initiator sends the I/O requests to the bus, wherein the secondary target accesses the I/O requests placed on the secondary bus by the initiator and performs the requested I/O requests to the base addresses of the memory in the bridge, whereby the I/O requests testing the memory in the bridge tests circuitry connecting the secondary target and the secondary bus.

46. The system of claim 45, wherein the I/O requests to the bridge comprise internal wrap signals between the initiator and the secondary target in the bridge.

47. The system of claim 43, wherein the means for testing the memory in the bus interface and each bus device further performs:

writing data to the base addresses of the memory;

reading the base addresses to which data was written; and for each base address to which data was written, comparing the data read with the data written to determine whether the data read and written to each base address is the same, wherein there is an error if the data read and written data does not match.

48. A system for performing a verification of a bus interface, comprising:

a bus interface including an embedded device and memory;

a bus, wherein the bus interface enables communication with the bus;

a bus device communicating over the bus, wherein the bus interface memory is capable of being accessed by one bus device communicating over the bus, and wherein the embedded device uses the bus interface to communicate on the bus;

means for causing the bus device to test the memory in the bus interface by issuing Input/Output (I/O) requests to the memory in the bus interface over the bus; and means for causing the embedded device to test the memory in the bus interface by issuing Input/Output (I/O) requests to the memory in the bus interface over the bus, whereby the tests performed by the bus device and embedded device test whether the bus interface is capable of handling requests from multiple bus devices over the bus.

49. The system of claim 48, wherein the bus interface includes an initiator and target, wherein the memory in the bus interface is accessible through the target, and wherein the means for testing the memory in the bus interface with the embedded device further performs:

transmitting the I/O requests to the initiator, wherein the initiator transmits the I/O requests to the bus, and wherein the target accesses the I/O requests placed on the bus by the initiator and performs the requested I/O requests, whereby the I/O requests from the initiator testing the memory on the bus interface further test circuitry connecting the target and bus.

* * * * *